United States Patent [19]

Saito et al.

[11] Patent Number: 4,630,209

[45] Date of Patent: Dec. 16, 1986

[54] AUDIO/VISUAL DISPLAY SYSTEM FOR MULTIPLE MAPS

[75] Inventors: Takao Saito; Masakazu Moriyama, both of Aichi, Japan

[73] Assignee: Toyota Jidosha Kogyo Kabushiki Kaisha, Toyota, Japan

[21] Appl. No.: 388,170

[22] Filed: Jun. 14, 1982

[30] Foreign Application Priority Data

Jul. 1, 1981 [JP] Japan ................................ 56-102757

[51] Int. Cl.⁴ ......................... G06F 15/50; G08G 1/12

[52] U.S. Cl. .................................... 364/444; 364/436; 364/449; 340/995; 340/996; 353/12

[58] Field of Search ............... 364/444, 449, 436, 460, 364/424, 443; 340/286, 995, 996; 353/12, 11, 13, 14, 15

[56] References Cited

U.S. PATENT DOCUMENTS

| | | | |
|---|---|---|---|
| 2,548,488 | 4/1951 | Mella | 353/12 |
| 3,618,240 | 11/1971 | Pelin | 340/995 X |
| 3,925,641 | 12/1975 | Kashio | 340/996 X |
| 4,086,632 | 4/1978 | Lions | 364/444 |
| 4,159,490 | 6/1979 | Wood | 340/996 X |
| 4,190,819 | 2/1980 | Burgyan | 364/449 |
| 4,253,150 | 2/1981 | Scovill | 364/444 |
| 4,291,373 | 9/1981 | Mizote et al. | 364/443 |
| 4,301,506 | 11/1981 | Turco | 364/444 |
| 4,312,577 | 1/1982 | Fitzgerald | 364/444 |
| 4,360,876 | 11/1982 | Girault et al. | 364/449 |
| 4,363,055 | 12/1982 | Lee | 353/15 |
| 4,402,050 | 8/1983 | Tagami et al. | 364/460 |
| 4,428,052 | 1/1984 | Robinson et al. | 364/444 |
| 4,428,057 | 1/1984 | Setliff et al. | 364/444 |
| 4,490,717 | 12/1984 | Saito | 340/996 |

FOREIGN PATENT DOCUMENTS

| | | | |
|---|---|---|---|
| 2025722A | 1/1980 | United Kingdom | 364/443 |

OTHER PUBLICATIONS

Peter Braegas, Function, Equipment, and Field Testing of a Route Guidance and Information System for Drivers (ALI), IEEE Transactions on Vehicular Technology, vol. VT-29, No. 2, May 1980, pp. 216–225.

*Primary Examiner*—Gary V. Harkcom

*Attorney, Agent, or Firm*—Cushman, Darby & Cushman

[57] ABSTRACT

Data for a map of a predetermined area is divided into a plurality of blocks, stored in an external memory medium such as a cassette tape, and loaded into a CPU when deemed necessary. The map as a whole or parts of the map can be arbitrarily selected and displayed through the operation of a keyboard, and vocal sightseeing guidances corresponding to the displayed maps are simultaneously produced. Control of this multiple map system is effected by an electronic device having a microprocessor, and selected maps and necessary words are shown in displayed pictures by a display means, such as a cathode ray tube or the like.

7 Claims, 4 Drawing Figures

AUDIO/VISUAL DISPLAY SYSTEM FOR MULTIPLE MAPS

BACKGROUND OF THE INVENTION

1. Field of the Invention

The present invention relates to a suitable driving guide system for indicating a map required for the driving of a vehicle (such as a motor car) within a driving by use of an electronic unit.

2. Description of the Prior Art

While driving through an unfamiliar district in a motor car, one can use only a map book for help. Then, one driving the vehicle must frequently refer to the map book and look for the proper part of the map book while driving the vehicle. This system is troublesome, and moreover, safety of driving in this fashion may be hindered because of looking away from the driving direction.

SUMMARY OF THE INVENTION

An object of the present invention is to provide a driving guide system wherein a general map aand partial maps representing the district of expected driving can be arbitrarily selected and indicated by use of electronic means.

Another object of the present invention is to provide a driving guide system wherein various vocal guidances can be produced corresponding to the indicated pictures of maps.

It is most convenient for drivers to use maps sectionalized in accordance with cities for business purposes, and to use maps centered around specific sight-seeing sites for sight-seeing purposes. Furthermore, when it is desired to drive on superhighways, maps of diverging highways centered around interchanges are required. The above-described type of map data extending over a wide area has become necessary, and hence, it is inadvisable to store such map data in a nonvolatile memory. It is preferable to store such map data in a RANDAM ACCESS MEMORY (hereinafter RAM). When RAM is used, the data or program must be read in from an external memory medium. A cassette tape is most suitable as this external memory medium. It is more convenient if data for the maps are recorded onto cassette tapes by the driving guide system manufactures (with the cassette tapes supplied by distributors) than if the users themselves record the map data onto the cassette tapes.

Figure 1:
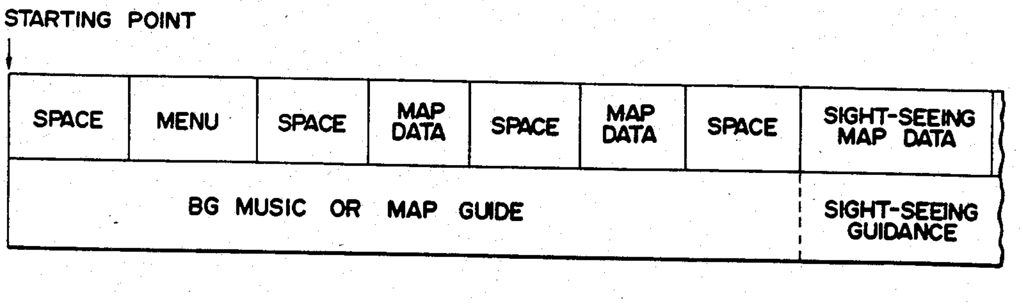
FIG. 1 shows the recording method of a cassette tape according to the present invention.

The recording method (format) of the cassette tape preferably follows that shown in FIG. 1, for example. One track of the tape has recorded thereon image data and another track voice data. In the lead portion of the tape, "SPACE" representing a non-recorded section is provided, which is followed by "MENU" storing the map data 20 indicating what section of a general map correponds to a partial map shown in FIG. 2. Further, after providing another "SPACE" after the map data 20, partial maps 21, 23, 24, 25 and so on are recorded on the tape. When a sight-seeing site or sites are included in "MENU" 20, the data of sight-seeing maps 31 and 32 are recorded as well. Particularly when a sight-seeing map is indicated, it is desirable to prepare vocal sight-seeing guidance along with the indication of the map. For this purpose, vocal data (recorded human are recorded on the voice data track simultaneously with the recording of the sight-seeing map data on the image data track, so that reproduction of the vocal sight-seeing guidance started simultaneously with the indication of the sight-seeing map. The above-described data from the external memory medium is loaded to the driving guide system, and description will now be given of the arrangement thereof with reference to the drawings.

Figure 3:
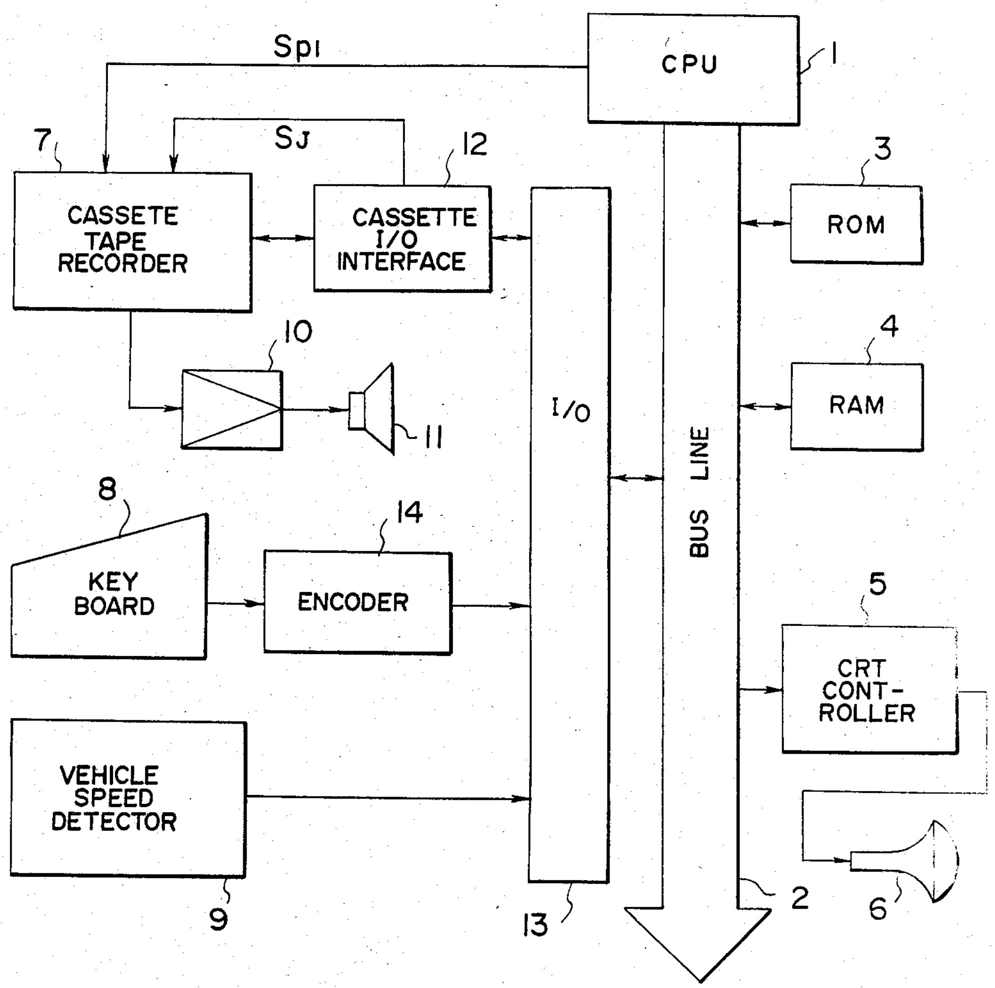
FIG. 3 is a block diagram of an embodiment of the present invention.

FIG. 3 is a block diagram showing an exemplary embodiment of the present invention.

The core of the system is a central process unit (hereinafter referred to as "CPU") 1, to which are connected through a bus line 2 a variety of components essential for constituting a computer, including a nonvolatile memory (hereinafter ROM) 3, a volatile memory (RAM) 4, a cathode ray tube (hereinafter CRT) controller 5 and CRT 6. In addition, CRT may be replaced by a liquid crystal, a fluorescent indicating tube, plasma, electroluminescence or the like. Additionally, connected to CPU 1 as external components are cassette tape recorder 7, keyboard 8 and vehicle speed pulse generator 9. The cassette tape recorder may have two tracks to four tracks, one track of which is used for voice. An output signal from this voice track is amplified by an amplifier 10, and then, actuates a speaker 11. Another track from the remaining track (or tracks) is used for map data recorded in a predetermined format. This cassette tape recorder 7 is connected to an input/output (hereinafter I/O) interface 13 (a peripheral IC) through a cassette interface 12. For example, the cassette interface 12 may modulate an output signal from I/O 13 at a transfer speed of about 300 to 4800 baud and demodulate an output signal from the cassette tape recorder 7 (In this case, the output signal is emitted from I/O 13 as a serial signal). The keyboard 8 has keys for specifying necessary city maps, sight-seeing maps, MENU and the like, a key specialized for erasing pictures, keys for 26 alphabet letters, and keys for numerals 0 to 9 and so forth. The keyboard encodes a key intput in an encoder 14, converts it into an ASCII code for example, and feeds it I/O 13. Further, the vehicle speed pulse generator 9 generates pulse signals commensurate with the rotation of a tire of the vehicle, and generates these pulse signals only during driving of the vehicle. A driving distance can be determined from the number of pulse signals fed from this vehicle speed pulse generator 9.

ROM 3 incorporates therein a monitor program, a program for processing the map data, and programs for processing data from the externally connected components, controlling the cassette tape recorder 7 and processing indications.

RAM 4 temporarily stores the data recorded in the cassette tape, and comprises a volatile memory which loses the stored data by being reset due to power-off (i.e., ignition switch off) or the ejection of the cassette tape, and all of the data are thus cleared. The CRT controller 5 comprises a bus controller, a character generator, a signal converter, a synchronous signal generator and the like, and the contents of data selected by the keyboard 8 are indicated on CRT 6. In this case, the indication of the map may be made by dark or light tint of mono-color patterns, or color patterns of eight or sixteen colors, with colors, a contraction scale and the like determined in accordance with the size of the CRT. In the case of using a color CRT on 6 in. (as CRT 6 for example) the picture area is 112.5 mm×83.0 mm. If the indication resolving power is 256×192 dots maximum, then the scope of 49142 dots becomes the data of a map which can be indicated. Description will hereunder be made of the function of the above-described invention.

The present invention specifically satisfies the following respective functions, and detailed description thereof will be given for each item.

(a) Indication of the maps (b) Vocal sight-seeing guidance

Figure 4:
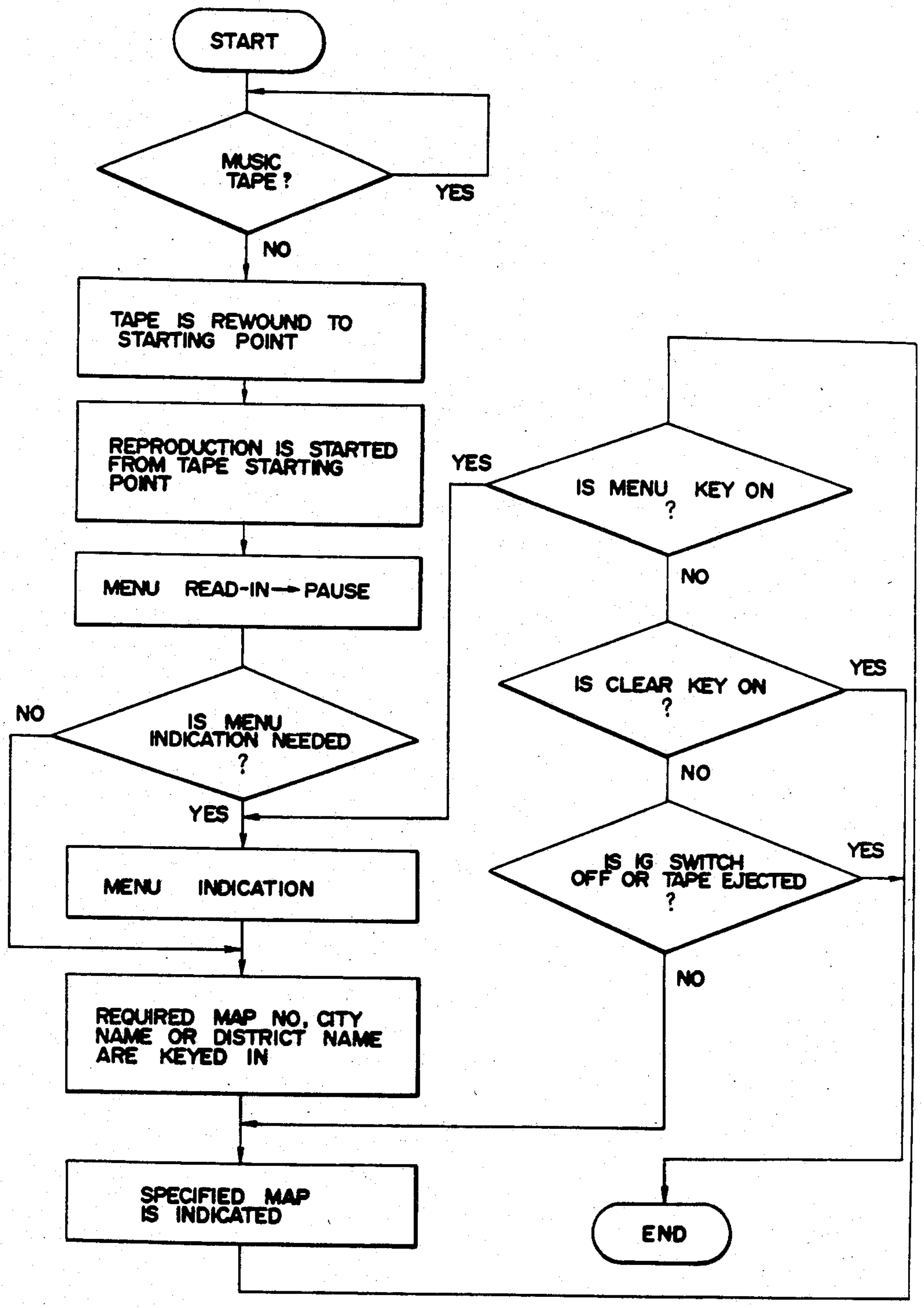
FIG. 4 is a flow chart showing an example of the process of indicating a map according to the present invention.

In indicating the maps, the process shown in FIG. 4 is followed. Now, the cassette tape storing map data concerning the districts of the scheduled driving course is inserted into the cassette tape recorder 7, and a play button "PLAY" of the tape recorder is pressed to start the tape. This operation brings about the reproduction process. No problems occur when a tape recorder specialized for use in the driving guide system is selected. However, when an ordinary audio tape recorder is used, sometimes, an ordinary music tape may be played by mistake, and hence, it is necessary to judge the type of the tape. Judgement as to whether it is an ordinary music tape is made based on the fact that a tape concerned with the present invention, which has recorded thereon digital signals, is modulated to two types of frequencies, i.e., high and low. In other words, the judgement is made based on whether these frequencies are continuously generated for a predetermined period of time. In the case of the music tape, CPU 1 does not make any further process, and the signals, which have been prerecorded, are continuously reproduced. Consequently, the operator makes judgement to discontinue playing the tape or not. On the other hand, in the case of the map data tape, the tape is rewound irrespective of its present point and is set at its starting point. This position is the starting point of the tape head portion shown in FIG. 1, and upon completion of rewinding, reproduction is started. (See FIG. 4.) The cassette tape recorder 7 obtains a tape judging signal $S_J$ from the cassette interface 12. CPU incorporated in the cassette tape recorder 7 controls rewinding and reproduction based on this tape judging signal $S_J$.

As the reproduction of the tape progresses, the data in the "MENU" portion is loaded, and at the same time, the vocal data which have been recorded are produced from speaker 11. Upon completion of the read-in of the data of the "MENU" portion, CPU 1 feeds PAUSE signal ($S_P$) to the cassette tape recorder 7, whereby the tape is stopped in movement (a state of pause). When a tape read error occurs during loading this tape, error data is indicated in CRT 6, and simultaneously, CPU 1 feeds a control signal $S_C$ to the cassette tape recorder to rewind the cassette tape.

Figure 2:
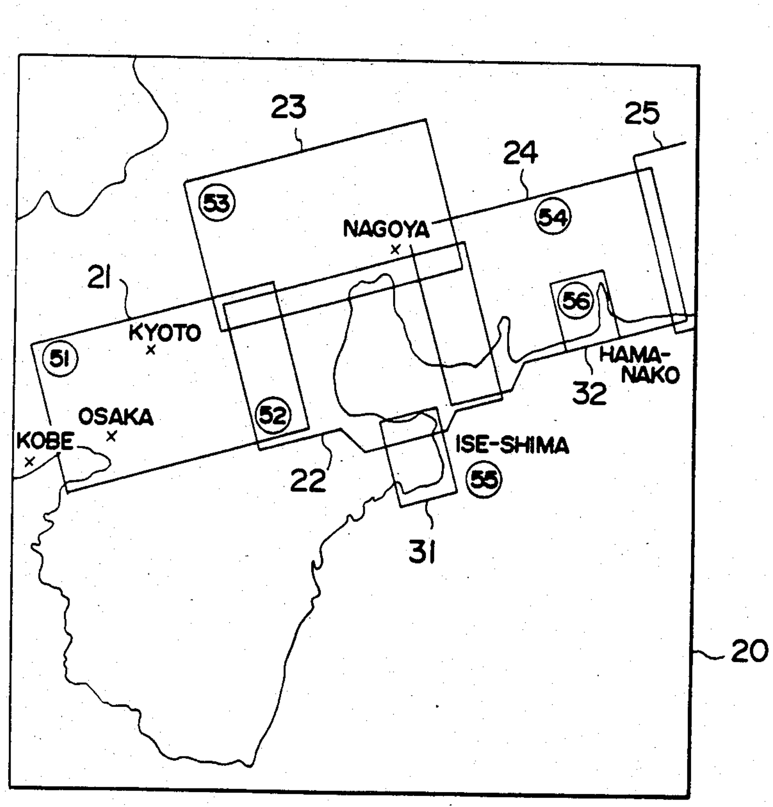
FIG. 2 is an example of an indicated map according to the present invention.

Upon completion of the read-in of the "MENU" portion, an indication "Is MENU indication necessary?" is made in CRT 6, whereby a key-in operation of "YES" or "NO" on the keyboard 8 is required from an operator such as the driver. If the operator does key-in "YES", then everything in the map 20 shown in FIG. 2 is indicated. Then, the operator performs key-in by use of alphabets the number of the map desired from among the partial maps (51, 52, 53 or 54 in the examaples of the drawing) or the name of the city itself. If indication of City NAGOYA and therearound is required for example, then, the alphabets enclosed by quotation marks as in "N", "A", "G", "O", "Y", "A" are successively keyed in. Or, in place of the alphabets, a number corresponding to the alphabets, e.g., 53 corresponding to City NAGOYA in FIG. 2, is usable. Namely, "5" and "3" are keyed in. Further, if a map of the diverging highways is required, then "B" is keyed in before the place name or the number of the map. Firstly, "B" is keyed in, then, one spacing is made, and "N", "A", "G", "O", "Y", "A" or "5", "3" are keyed in.

When the indicated map becomes unnecessary and must be erased, the map may be erased by the pressing of a "CLEAR" key for example. Furthermore, when it is desired to indicate a map immediately ahead of the map indicated at present, i.e., the map number 54 following the map number 53, renewal can be effected by the pressing of a "NEXT" key. In this case, the instruction of renewal may be given regardless of the sequential order. To meet this situation, when a city name or a map number is fed, CPU 1 feeds to the cassette tape recorder 7 a searching command instructing what number counted from the head of the tape or counted in the forward (or rearward direction from a specified map number located in the intermediate portion) is to be indicated. The cassette tape recorder 7 moves the cassette tape to the position of the map thus searched.

When the sight-seeing sites such as MAP 31 or 32 (ISE-SIHIMA 55, HAMANAKO 56) are indicated by key-in operation, the driving distance of the vehicle is calculated based on the data from vehicle speed detector 9, and sight-seeing guidance by images are indicated on CRT 6 and vocal sight-seeing guidance is produced from the speaker 11 in accordance with the driving distance based on the results of the calculation as described above.

As has been described hereinabove, according to the present invention, even in case where a large amount of data such as maps are required due to the use of the external memory medium including cassette tapes, indication of a map required by a driver or passenger may be quickly effected, and both the picture indication and the vocal guidance may be simultaneously performed for sight-seeing guidance. As a result, fatique or distraction of the driver may be reduced to a considerable extent and a safer drive will result.

It should be apparent to those skilled in the art that the above-described embodiment represents but one of the many possible specific embodiments of the present invention. Numerous and varied other embodiments can be devised by those skilled in the art without departing from the spirit and scope of the present invention.

What is claimed is:

1. A system for selectively producing visual and audio information relating to at least one geographical map, comprising:

a magnetic tape disposed in a standard cassette enclosure, said tape having serially stored thereon (a) digital signals representing images of plural distinct geographical maps, (b) digital signals representing an image of predetermined designations of each of said maps, and (c) analog signals representing sounds associated with said images, said analog signals being physically stored on said tape in proximity to the digital signals representing images associated therewith;

means for automatically locating a first position on said tape at which said digital signals representing said image of said predetermined designations are stored, and for automatically locating a second position on said tape at which said digital signals representing the image of a selected geographical map are stored;

means for reading said digital signals representing said image of said predetermined designations from said tape beginning at said first located position, and for reading said digital signals representing the image of said selected map and said analog signals representing sounds associated with the image of said selected map from said tape beginning at said second located position;

means for visually displaying the image of said predetermined designations in response to said digital signals read by said reading means, and for visually displaying the image of said selected map in response to said digital signals read by said reading means;

means for generating sounds in response to said analog signals read by said reading means; and control means for selecting one of said predetermined designations in response to the image of said predetermined designations produced by said display means, and for controlling said locating means to locate the position on said tape at which said digital signals representing the image of the geographical map designated by said selected designation are stored.

2. A system as in claim 1 wherein said control means also (a) controls said locating means to locate the first position on said tape at which said digital signals representing said image of said predetermined designations are stored subsequently to controlling said locating means to locate the second position on said tape at which said digital signals representing said image of a geographical map designated by said selected designation are stored, (b) controls said display means to again display said image of predetermined designations in response to said digital signals read by said reading means, (c) selects a further designation in response to said image produced by said display means, and (d) controls said locating means to automatically locate a further position on said tape at which said digital signals representing the image of said geographical map designated by said further selected designation are stored.

3. A system as in claim 1 wherein:

said system further includes means for producing a tape judging signal if said signals read by said reading means are in digital form; and said control means is inhibited from operating unless said tape judging signal is present.

4. A method of selectively producing visual and audio information relating to a selected geographical map, comprising the steps of:

(1) providing a magnetic tape disposed in a standard cassette enclosure, said tape having serially stored thereon (a) digital signals representing images of plural distinct geographical maps, (b) digital signals representing an image of predetermined designations of each of said maps, and (c) analog signals representing sounds associated with said images, said analog signals being physically stored on said tape in proximity to the digital signals representing images associated therewith;

(2) automatically locating the position on said tape at which said digital signals representing said image of said predetermined designations are stored;

(3) subsequent to said locating step (2), reading said digital signals representing said image of said predetermined designations from said tape;

(4) visually displaying said image of said predetermined designations in response to said digital signals read by said reading step (3);

(5) selecting one of said predetermined designations displayed by said displaying step (4);

(6) automatically locating the position on said tape at which said digital signals representing said image of the geographical map designated by said designation selected by selecting step (5) is stored;

(7) subsequent to said locating step (6), reading said digital signals representing said image of said selected map and said analog signals representing sounds associated with said image of said selected map from said tape;

(8) visually displaying said image of said selected map in response to said digital signals read by said reading step (7); and (9) concurrently with said displaying step (8), generating sounds in response to said analog signals read by said reading step (7).

5. A method as in claim 4 further including the step of repeating said locating step (2) through said displaying step (9) in response to a command input by a user.

6. A method as in claim 4 further including the steps of:

(a) reading signals stored on said tape;

(b) producing a tape judging signal if said signals read by said reading step (a) are digital in form; and (c) performing said steps (2)–(9) only if said producing step (b) produces said tape judging signal.

7. A method of selectively producing visual and audio information concerning a plurality of discrete geographical maps, comprising the steps of;

(1) storing indicia of images of plural distinct geographical maps and directory data including a designation of each of said maps on a cassette tape;

(2) storing audio information corresponding to said maps on said tape, said audio information being stored physically adjacent to corresponding indicia of images stored on said tape;

(3) automatically initializing the position of said tape to a start position at which said directory data is stored;

(4) reading said directory data from said cassette tape;

(5) visually displaying said designations included in said directory data;

(6) selecting one of said displayed designations;

(7) automatically locating on said tape the indicia of the image of the map corresponding to said selected designation;

(8) reading said located map indicia and corresponding audio information from said tape;

(9) displaying the image of said map the indicia of which is read by said reading step (8); and

(10) generating, simultaneously with said reading and displaying steps (8, 9), audio in response to said audio information read by said reading step (8).

* * * * *